United States Patent [19]
Brown et al.

[11] Patent Number: 5,297,227
[45] Date of Patent: Mar. 22, 1994

[54] DISENGAGABLE ADAPTER FOR AN OPTICAL FIBER CONNECTION

[75] Inventors: Gair D. Brown, Dahlgren; Michael A. Richardson; Gary A. Burcham, both of Fredericksburg, all of Va.

[73] Assignee: The United States of America as represented by the Secretary of the Navy, Washington, D.C.

[21] Appl. No.: 33,223

[22] Filed: Mar. 18, 1993

[51] Int. Cl.⁵ .......................... G02B 6/38; G02B 6/26
[52] U.S. Cl. ........................................ 385/56; 385/55; 385/59; 385/60; 385/66; 385/70; 385/71; 385/138; 385/139
[58] Field of Search ............... 385/55, 56, 59, 60, 385/66, 70, 71, 72, 76, 77, 78, 84, 137, 138, 139

[56] References Cited

U.S. PATENT DOCUMENTS

| | | | |
|---|---|---|---|
| 4,553,814 | 11/1985 | Bahl et al. | 385/78 X |
| 4,738,507 | 4/1988 | Palmquist | 385/84 X |
| 4,812,009 | 3/1989 | Carlisle et al. | 385/66 X |
| 4,880,291 | 11/1989 | Aberson, Jr. et al. | 385/55 X |
| 4,895,424 | 1/1990 | Hughes | 385/56 |
| 4,896,939 | 1/1990 | O'Brien | 385/101 X |
| 4,991,929 | 2/1991 | Bowen et al. | 385/70 X |
| 5,074,637 | 12/1991 | Rink | 385/56 |
| 5,113,462 | 5/1992 | Clancy et al. | 385/53 |
| 5,115,483 | 5/1992 | Morency et al. | 385/60 |
| 5,121,455 | 6/1992 | Palecek | 385/66 X |
| 5,159,651 | 10/1992 | Gandy | 385/56 |
| 5,170,452 | 12/1992 | Ott | 385/56 X |

*Primary Examiner*—Brian Healy
*Attorney, Agent, or Firm*—John D. Lewis; Jacob Shuster

[57] ABSTRACT

A disengagable adapter for mechanically coupling optical fibers is provided. The disengagable adapter separates into two complementary receptacle parts. Each receptacle part receives through a bore a single optical-fiber located within an optical-fiber connector plug. Each receptacle part attaches to and securely holds a different connector plug. The receptacle parts mate with each other in a complementary fashion and thereby connect the two optical fiber connector plugs together. These connector plugs accordingly align the two optical fibers located within the plugs. The optical fibers can be separated either by demating the complementary parts or by disconnecting one side of the adapter from its connector plug. Mounting the complementary parts to a plate facilitates multiple, simultaneous connections.

14 Claims, 3 Drawing Sheets

DISENGAGABLE ADAPTER FOR AN OPTICAL FIBER CONNECTION

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The present invention relates generally to optical-fiber connectors and more specifically to a disengagable adapter for connecting two optical fibers.

BACKGROUND OF THE INVENTION

In recent years, electro-optical equipment has begun to replace electronic equipment for certain applications such as telecommunications networks. This trend should continue because electro-optical equipment has inherent advantages over purely electronic equipment. These advantages include a broader bandwidth for signal transmission, greater storage capability for data, and quicker processing of information. Given these advantages of electro-optical equipment, optical-fiber cables have become increasingly important because they transmit information and signals between the various pieces of electro-optical equipment. Optical-fiber cables comprise optical fibers which are surrounded by strength members and an external jacketing. The appearance of these cables resemble electric-shielded cables, but optical fiber cables are smaller in size and lighter in weight.

Because optical-fiber cables transmit information optically, the interconnection between two cables requires precise alignment and abutment in order to avoid severe loss of transmitted data. Researchers, therefore, have expended a great deal of time and effort developing connectors which provide interconnections between optical-fiber cables with low loss and low reflection. One method of connection involves using connector plugs which have a ferruled component surrounding the optical fiber. U.S. Pat. No. 5,113,462 by Clancy et al. is an example of an optical-fiber connector having ferruled components.

Clancy et al. disclose an optical-fiber coupler which includes an adapter that interfaces two optical-fiber connector plugs having ferruled components. The adapter in Clancy is the standard SMA 906 in-line adapter. This type of adapter includes one elongated cylindrical structure having two openings for receiving two separate connector plugs. The cylindrical structure has threaded outer surfaces on its ends which complement the threaded nuts located on the optical-fiber connector plugs. Accordingly, the threaded surfaces of the adapter screw into the nuts of the connector plug to secure the plug firmly in place and bring the plugs into alignment. The adapter also has a main opening which receives an alignment sleeve. This sleeve properly positions and holds the ferruled components into the physical abutment required for connecting the optical fibers.

Although the standard in-line adapter provides the required connection and alignment of the optical fibers, this connection can be disengaged only by demating the adapter from the connector plug itself. Assembly and disassembly of multiple rows of connections thereby require making each connection separately and individually. In a naval combat environment however, battle damage and system failures often require a rapid assembly and disassembly of multiple optical-fiber connections for fire control, ship defense, and other critical systems.

Additionally, the standard in-line adapter couples two connector plugs which have one only method of attachment to the adapter. Occasionally, however, two different methods of attachment, such as a bayonet socket and a threaded socket, must be connected in-line. These in-line connections typically require use of a jumper cable. The jumper cable comprises an optical-fiber cable with two different connector plugs on its ends. The first connector plug of the jumper cable has a method of attachment, such as a threaded socket, which matches the method of attachment of the first plug to be connected. The second connector plug of the jumper cable has a method of attachment, such as a bayonet socket, which matches the method of attachment of the second plug to be connected. An in-line connection made with a jumper cable accordingly requires two in-line adapters and two in-line connections. Each in-line connection increases the loss of transmitted data between the abutting optical fibers.

SUMMARY OF THE INVENTION

Accordingly, an object of the present invention is to mechanically couple two optical-fiber connector plugs.

Another object of the present invention is to mate and demate a single in-line connection of two optical-fiber connector plugs without demating the optical fiber connector plugs from an adapter.

Yet another object is to connect in-line two different types of connector plugs without a jumper cable.

A further object is to simultaneously mate or demate multiple, optical fiber connector plugs.

The foregoing and additional objects are attained by providing a disengagable adapter for mechanically coupling two single fiber, optical connector plugs. The adapter separates into two complementary parts for receiving the optical fiber connector plugs. These separable complementary parts are configured either as identical parts or as one male part and one female part. Each part attaches to and holds one of the optical fiber connector plugs and mates with the other complementary part. Each complementary part is readily dematable from both the connector plug and the other complementary part. Each complementary part may be threaded into or mounted onto a support element such as a flat plate. Mounting several of the complementary parts each to a plate and positioning these two plates together facilitates multiple, simultaneous connections of several disengagable adapters. Preferably, an alignment sleeve fits inside one of the two complementary parts and aligns the ferrules of the optical fiber connector plugs.

BRIEF DESCRIPTION OF THE DRAWINGS

The numerous advantages of the present invention will be more fully appreciated from the detailed description when read with reference to the appended drawings wherein.

DETAILED DESCRIPTION OF THE INVENTION

Figure 1:
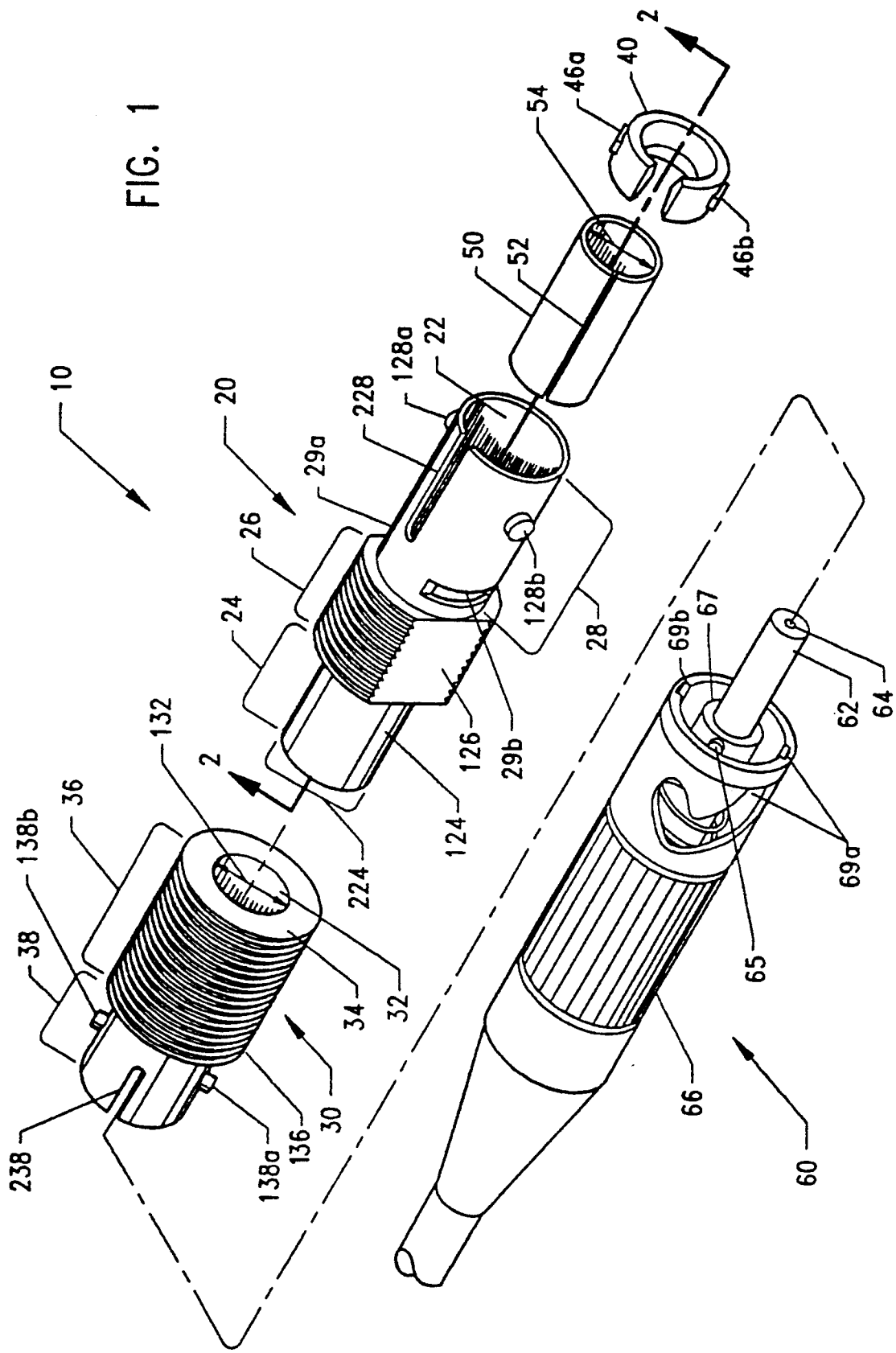
FIG. 1 is a perspective view of a disengagable adapter for mechanically coupling optical fiber connector plugs.

Referring now to FIG. 1, a disengagable adapter 10 for mechanically coupling two optical-fiber connector plugs is shown. The adapter 10 comprises a male cylindrical housing 20, a female cylindrical housing 30, an alignment bushing 40, and an alignment sleeve 50. The male and female cylindrical housings mate with each other in a complementary fashion at one end. At their other ends, the cylindrical housings each attach to and securely hold an optical-fiber connector plug 60. The connector plug 60 has a ferrule 62 which surrounds and protects an optical fiber 64. When the two housings 20 and 30 are mated together, two connector plugs are aligned. Accordingly, the adapter 10 mechanically couples together and aligns the ferrules located within the two plugs.

The male cylindrical housing 20 has an inner bore 22 and three outer regions of differing function—a mating end 24, a mounting region 26, and a connecting end 28. The mating end 24 includes a protrusion 124 with a diameter 224. The protrusion 12 inserts into the female cylindrical housing 30. The mounting region 26 comprises a threaded surface 126 for screwing the housing 20 into a threaded tap. Alternatively, the mounting region 26 comprises a flange with threaded taps (not shown) for mounting the housing to a flat plate. The third outer region, the connecting end 28, attaches to the optical-fiber connector plug 60.

The female cylindrical housing 30 has an inner bore 32 and three regions of differing function—a second mating end 34, a second mounting region 36, and a second connecting end 38. The second mating end 34 includes the bore 32 having a diameter 132 which is slightly greater than the diameter 224 of the protrusion 124. The sizing of diameter 132 enables the protrusion 124 to insert within the bore 32 for a clearance fit which still provides precise in-line abutment between housings 20 and 30. The second mounting region 36 as shown in FIG. 1 comprises a threaded surface 136 for screwing the housing 30 into a threaded tap. Alternatively, the mounting region comprises a flange with threaded taps (not shown) for mounting the housing to a flat plate. The second connecting end 38 attaches to the optical-fiber connector plug 60.

The alignment sleeve 50 is a tube having a slit 52 running essentially parallel along its longitudinal axis. The sleeve 50 is inserted into bore 22 of housing 20. The inside diameter 54 of the sleeve 50 is only slightly smaller than the outside diameter of the ferrule 62 of the connector plug. The slit 52 allows the sleeve 50 to expand and receive the ferrule 62 during insertion of connector plug 60. Thus, the sleeve 50 provides a snug fit with the ferrule and aligns the ends of the optical fibers 64 into the required face-to-face physical abutment.

Figure 2:
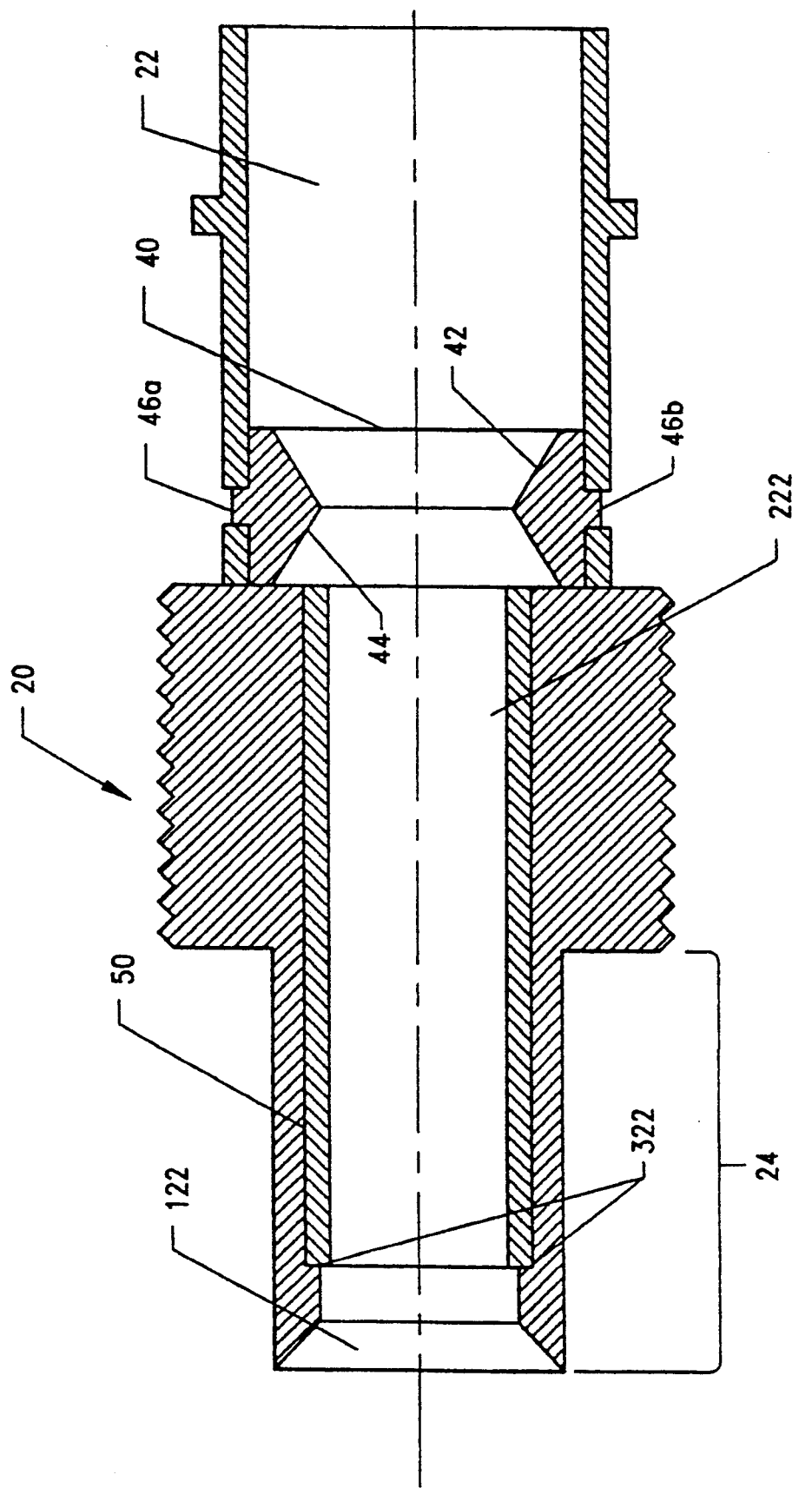
FIG. 2 is a cross-sectional view of a male housing of a connector having an alignment sleeve and an alignment bushing installed.

FIG. 2 sows a cross-sectional view of the male housing 20 having the alignment sleeve 50 installed. The bore 22 has an inner opening 222 which is sized for receiving the sleeve 50. The bore 22 of male housing 20 enables the ferrule 62 of the connector plug to enter the housing. The bore 22 also includes a tapered surface 122 located near the end of the mating end 24. The tapered surface 122 gives the bore 22 a funnel-shape on the mating end and assists in aligning the ferrule of the connector plug attached to the female housing into the male housing 20. A shoulder 322 is at one end of the inner opening 222. Shoulder 322 acts as an edge to axially position the alignment sleeve 50 within bore 22 as shown in FIG. 2.

The alignment bushing 40 is a C-shaped sleeve having two opposing tapered inner surfaces 42 and 44 and two knoblike projections 46a and 46b on its outer surface 48. The tapered inner surfaces are opposing so as to eliminate a determination of which direction the bushing should face before installation. Referring to FIGS. 1 and 2, assembly of the alignment bushing 40 involves inserting the bushing at the connecting end 28 into the bore 22 of the male housing and then sliding the bushing until the knoblike projections 46a and 46b snap into two notches 29a and 29b, respectively, located in the housing 20. The tapered surface of the bushing 40 aids in aligning the ferrule 62 of the connector plug connected to the male housing into the alignment sleeve 50. The bushing also contains the alignment sleeve 50 within the inner opening 222.

Figure 3:
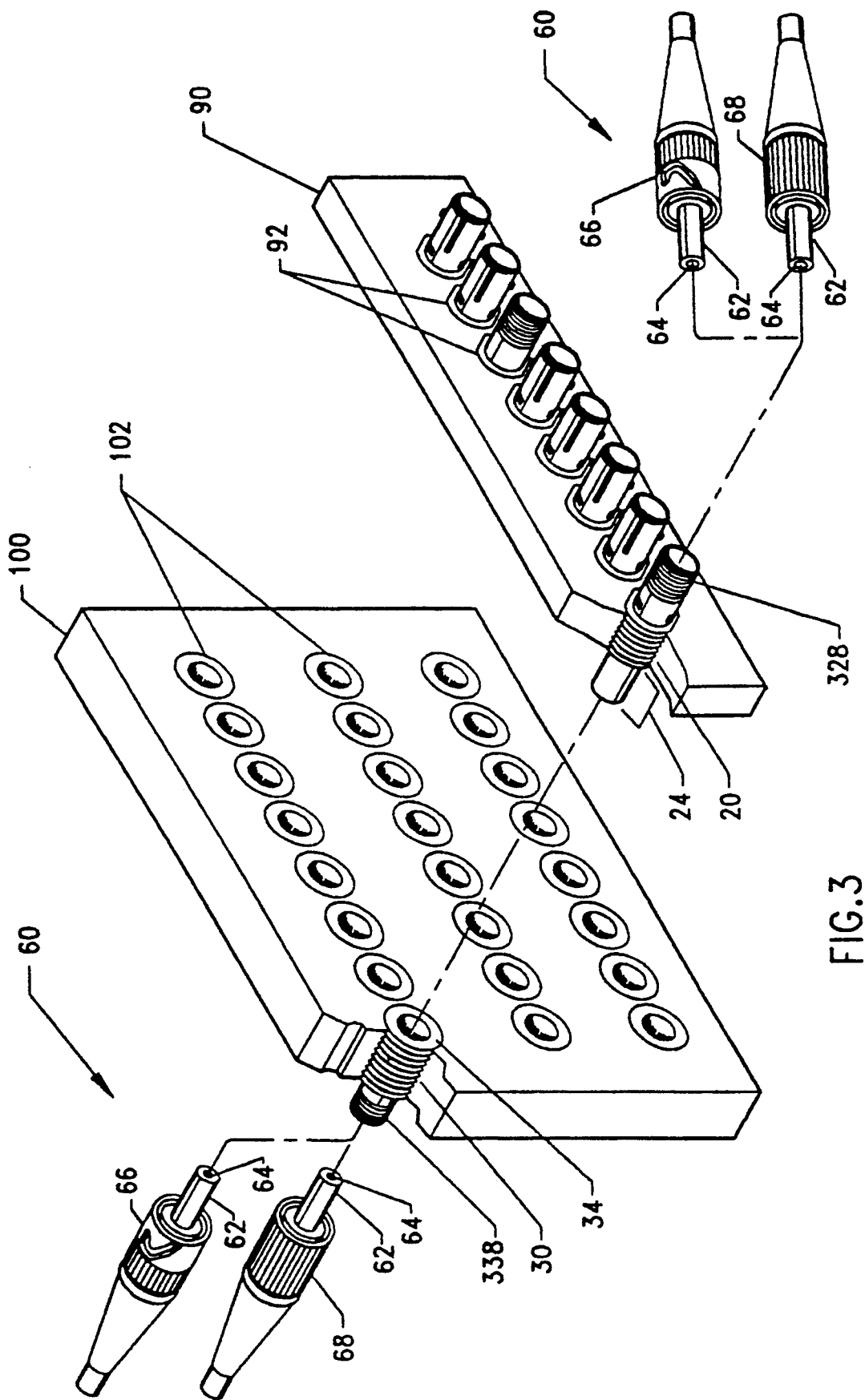
FIG. 3 illustrates the disengagable adapter as used for an instrument panel.

As shown in FIGS. 1 and 3, the connector plug 60 has different methods of interfacing and attaching with an adapter. One method is illustrated in FIGS. 1 and 3 as a bayonet socket 66. FIG. 3 also shows a threaded socket 68 which is another method of attachment to an adapter. Other methods of attachment exist but are not shown.

One of the advantages of the present invention is that the connecting ends 28 and 38 may be configured to attach to the connector plug 60 with any method of attachment. FIG. 1 illustrates a connecting end 28 designed for attaching to a connector plug having a bayonet socket 66. The connecting end 28 includes two knoblike projections 128a and 128b and a slot 228. The connecting end 28 attaches to the bayonet socket 66 by first aligning the slot 228 with a key 65 located at the edge of a barrel 67. At the same time, knoblike projections 128a and 128b are aligned with two keyways 69a and 69b of socket 66. The end 28 is then inserted into the bayonet socket 66 until it slides into a locked position.

Alternatively, FIG. 3 illustrates a connecting end designed for attaching to a connector plug 60 having a threaded socket 68. In this configuration, the connecting end simply has a threaded exterior surface 328 which attaches to the connector plug by screwing into the threaded socket 68.

FIG. 1 illustrates the connecting end 38 for attaching to the bayonet socket 66. The connecting end 38 includes two knoblike projections 138a and 138b and a slot 238. The connecting end 38 attaches to the bayonet socket 66 in the same manner as connecting end 28 attaches. The end 38 is installed by first aligning the slot 238 with the key 65 located at the edge of the barrel 67 while knoblike projections 138a and 138b are aligned with two keyways 69a and 69b, respectively. The end 38 is then inserted into the bayonet socket 66 until it slides into a locked position.

Alternatively, FIG. 3 illustrates a connecting end designed for attaching to a connector plug having a threaded socket 68. In this configuration, the connecting end simply has a threaded exterior surface 338 which attaches to the connector plug by screwing into the threaded socket 68.

FIG. 3 illustrates the assembly of multiple disengagable adapters for an instrument panel 100. In particular, FIG. 3 shows that each female housing 30 is mounted to the instrument panel 100 at its mounting region by screwing into one of a group of threaded taps 102. The ferrule 62 passes into the bore of each female housing, and the connection between each housing 30 and each plug 60 is secured. Similarly, each male housing 20 connects to a mounting plate 90 by screwing into one of the threaded taps 92 ordered in a row along the plate 90. Also similarly, the connecting ends of each male housing attach to a different connector plug 60. The ferrule 62 of each plug inserts into the bore of each male housing until the connection between each housing 20 and each plug 60 is secure. Although FIG. 3 shows the female housing connected to the instrument panel and the male housing connected to a plate, the opposite connection (male housing connected to the panel, female housing to the plate) would work equally as well.

Assembly of the disengagable adapter is completed by inserting the mating end 34 which is holding the ferrule of the plug connected to the female housing onto the mating end 24 of the male housing. The tapered surfaces 42 and 44 along the bore of the male housing ensures that the ferrule 62 of the plug connected to the female housing 30 aligns properly into the bore of the male housing 20. The ferrule received in the alignment sleeve 50 abuts its opposing ferrule of the plug connected to the male housing. Two optical fibers 64 are thereby aligned and connected.

By having an adapter which is itself disengagable, multiple simultaneous optical fiber connections may be made. Assembly of the disengagable adapter simply requires first positioning a row of male housings connected to the mounting plate 90 over a row of female housings mounted on the instrument panel 100. The mating ends for the row of male housings are then inserted into the bores of the female housings. As a result, an entire row of adapters are simultaneously connected. Similarly, by removing the plate 90 from its position over the panel 100, an entire row of adapters is simultaneously disconnected.

The protrusion 24 of the male housing 20 provides a common interface between the two mating complementary parts of the adapter. This common interface combines with the versatility of configuring the connecting ends 28 and 38 of the housings to enable face-to-face alignment of different optical-fiber connector plugs 60. In other words, an optical-fiber connector plug having a bayonet socket 66 can align face-to-face with an optical-fiber connector plug having a threaded socket. Accordingly, the use of jumper cables is eliminated and the number of in-line connections is reduced by one-half. By eliminating the use of jumper cables, the disengagable adapter permits all in-line connections to be made conveniently at one location, such as at an instrument panel. By reducing the number of in-line connections, the disengagable adapter also reduces losses of transmitted data between the plug connections.

The unique features of this invention include an adapter which can separate into two complementary parts and a standard interface between the two mating complementary parts of the adapter. The advantages of this invention include the ability to separate the adapter itself, the ability to mate the complementary parts of the adapter to two different types of connector plugs, and the ability to mount the complementary parts of the adapter to separate plates and thereby facilitate multiple simultaneous connections.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. An adapter mechanically coupling ferrules respectively located in two optical-fiber connector plugs, comprising: a first part holding one of the two optical-fiber connector plugs having a bore receiving the ferrule of said one of the connector plugs, a mating end and a connecting end having first means for securing said one of the connector plugs to said first part; and a second part disengagably coupled to the first part and holding the other of the two optical-fiber connector plugs having a mating end mating in a complementary fashion with the mating end of said first part and a connecting end having second means for securing the other of the connector plugs to said second part, said second part also having a hole through which the ferrule of the other of the connector plugs passes to effect said coupling of the ferrules.

2. An adapter as recited in claim 1 wherein said first part has a protrusion extending axially from the mating end thereof into the hole of said second part.

3. An adapter as recited in claim 1 wherein said first part includes outer surface means for mounting said first part on a flat plate.

4. An adapter as recited in claim 3 wherein the outer surface for mounting is threaded.

5. An adapter as recited in claim 3 wherein said second part has outer surface means for mounting said second part on a flat plate.

6. An adapter as recited in claim 5 wherein the outer surface means for mounting said second part is threaded.

7. An adapter as recited in claim 2 wherein the bore of said first part is tapered adjacent to the protrusion received therein to align the ferrule of the other of the connector plugs to the ferrule of said one of the connector plugs.

8. A two-part disengagable adapter for mechanically coupling ferrules located in two connector plugs as recited in claim 2 further comprising a C-shaped sleeve having two opposing tapered inner surfaces, said C-shaped sleeve being positioned within the bore of said first part for holding and aligning the ferrule of said one of connector plugs.

9. An adapter as recited in claim 1 further comprising sleeve means positioned within the bore of said first part for holding and aligning the ferrule of said one of the connector plugs to the ferrule of the other of the connector plugs.

10. An adapter as recited in claim 1 wherein said first means for securing includes a slot and two knoblike projections for connecting to a barrel knob and a bayonet socket of said one of the connector plugs.

11. An adapter as recited in claim 1 wherein said second means for securing includes two knoblike projections and a slot for connecting to a bayonet socket of said one of the second connector plugs.

12. An adapter as recited in claim 1 wherein said first means for securing includes a threaded surface for screwing into a threaded socket of the first connector plug.

13. An adapter as recited in claim 1 wherein said second means for securing includes a threaded surface for screwing into a threaded socket of the other of the connector plugs.

14. In combination with a pair of connector plugs respectively having an outer attachment portion and a ferrule projecting axially therefrom in protective relation to an optical fiber, a pair of separate support elements and connection adapter means mounted on said support elements for coupling of the optical fibers in the connector plugs, comprising: separate mating parts respectively fastened to the outer attachment portions of the connector plugs while positioned on the support elements, locking means on said mating parts and engageable with the connector plugs for holding the ferrules thereof in aligned positions therein and disengagable means responsive to insertion of the mating parts into each other with the ferrules held in said aligned position by the locking means for effecting said coupling of the optical fibers by axial abutment between the ferrules of the respective connector plugs.

* * * * *